US012540294B1

(12) United States Patent
Li et al.

(10) Patent No.: US 12,540,294 B1
(45) Date of Patent: Feb. 3, 2026

(54) DETERGENT TABLET COMPRISING A PLANT POLYSACCHARIDE AND ANIONIC/NONIONIC SURFACTANT MIXTURE

(71) Applicant: Guangzhou Joyson Cleaning Products Co., Ltd., Guangdong (CN)

(72) Inventors: Fenglei Li, Guangdong (CN); Jieer Luo, Guangdong (CN); Junli Li, Guangdong (CN); Jianfeng Sun, Guangdong (CN); Jieting Yan, Guangdong (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 0 days.

(21) Appl. No.: 19/305,858

(22) Filed: Aug. 21, 2025

Related U.S. Application Data

(63) Continuation of application No. PCT/CN2025/108552, filed on Jul. 15, 2025.

(51) Int. Cl.

| | |
|---|---|
| ***C11D 3/22*** | (2006.01) |
| ***C11D 1/14*** | (2006.01) |
| ***C11D 1/66*** | (2006.01) |
| ***C11D 1/83*** | (2006.01) |
| ***C11D 3/12*** | (2006.01) |
| ***C11D 3/20*** | (2006.01) |
| ***C11D 3/37*** | (2006.01) |
| ***C11D 3/386*** | (2006.01) |
| ***C11D 17/00*** | (2006.01) |
| ***C11D 17/06*** | (2006.01) |

(52) U.S. Cl.

CPC .............. *C11D 3/222* (2013.01); *C11D 1/146* (2013.01); *C11D 1/667* (2013.01); *C11D 1/83* (2013.01); *C11D 3/126* (2013.01); *C11D 3/2044* (2013.01); *C11D 3/3719* (2013.01); *C11D 3/38645* (2013.01); *C11D 17/0086* (2013.01); *C11D 17/06* (2013.01); *C11D 2111/12* (2024.01); *C11D 2111/14* (2024.01)

(58) Field of Classification Search

CPC ... C11D 17/0073; C11D 17/0086; C11D 1/83; C11D 3/0026; C11D 3/2065; C11D 3/33; C11D 3/386; C11D 3/50; C11D 7/268; C11D 7/44; C11D 9/44; C11D 11/0082; C11D 2111/12

See application file for complete search history.

(56) References Cited

U.S. PATENT DOCUMENTS

| | | | | |
|---|---|---|---|---|
| 7,199,096 | B1 * | 4/2007 | Weuthen | C11D 17/06 510/473 |
| 11,760,962 | B1 * | 9/2023 | Sun | C11D 3/43 510/298 |
| 12,281,285 | B1 * | 4/2025 | Li | C11D 3/226 |
| 2006/0223739 | A1 | 10/2006 | Zhu et al. | |
| 2023/0174898 | A1 | 6/2023 | Anderson et al. | |
| 2024/0209294 | A1 * | 6/2024 | Sun | C11D 3/2079 |
| 2024/0228915 | A1 * | 7/2024 | Sun | C11D 3/2082 |
| 2025/0066698 | A1 * | 2/2025 | Sun | C11D 3/386 |

FOREIGN PATENT DOCUMENTS

| | | | |
|---|---|---|---|
| AU | 2024205605 | B1 | 2/2025 |
| WO | 2014158472 | A1 | 10/2014 |

OTHER PUBLICATIONS

People's Republic of China (PRC) national standard, "Test method for biodegradability of surfactants", Dec. 28, 2018, 40 pages.

People's Republic of China (PRC) national standard, "Technical specification for safety of washing products", May 12, 2011, 12 pages.

People's Republic of China (PRC) national standard, "Determination of detergency and cyclic washing performance of detergents for clothing", Mar. 9, 2021, 55 pages.

The Chinese people National standards of the Republic, "Kitchen oil cleaner", Feb. 6, 2018, 23 pages.

People's Republic of China (PRC) light industry standard, "Laundry tablets", Apr. 21, 2023, 16 pages.

People's Republic of China (PRC) light industry standard, "Hard floor cleaning agent", Oct. 17, 2013, 19 pages.

The Chinese people China's national standards, "Paper—Determination of softness", Dec. 13, 2016, 11 pages.

The Chinese people China's national standards, "Determination of antistatic properties of fabric conditioners", Dec. 31, 2013, 28 pages.

People's Republic of China (PRC) light industry standard, "Determination of rewetting performance of fabric softener", Apr. 21, 2023, 18 pages.

Non-Final Office Action received in corresponding U.S. Appl. No. 19/305,890, dated Oct. 31, 2025, 15 pages.

Non-Final Office Action received in corresponding U.S. Appl. No. 19/295,834, dated Sep. 26, 2025, 17 pages.

* cited by examiner

*Primary Examiner* — Charles I Boyer

(74) *Attorney, Agent, or Firm* — Cooper Legal Group, LLC

(57) ABSTRACT

Disclosed are a detergent composition, a preparation method thereof, and a dissoluble detergent tablet, which fall within the field of detergent products. A detergent composition, wherein a raw material for preparing the detergent composition includes the following components by mass percentages: anionic surfactant: 11-45%; nonionic surfactant: 1-15%; plant polysaccharide: 5-30%; shape promoting agent: 3-18%; builder: 5-20%; enzymatic preparation: 0-5%; chelating agent: 0.5-5%; essence: 0-0.5%; and a balance of water; a ratio of a total mass of the anionic surfactant and the nonionic surfactant to a mass of the plant polysaccharide is (1-7):1; and a mass ratio of the plant polysaccharide to the shape promoting agent is (0.4-9):1. The present application has the effect of providing a more environmentally friendly detergent composition, and can be applied to the fields of fabric washing, hard surface cleaning, dishwashing and the like.

7 Claims, 5 Drawing Sheets

DETERGENT TABLET COMPRISING A PLANT POLYSACCHARIDE AND ANIONIC/NONIONIC SURFACTANT MIXTURE

CROSS-REFERENCE TO RELATED APPLICATION

The present application is a continuation of PCT application serial no. PCT/CN2025/108552, filed on Jul. 15, 2025. The entirety of PCT application serial no. PCT/CN2025/108552 is hereby incorporated by reference herein and made a part of this specification.

TECHNICAL FIELD

The present application relates to the field of detergent products, and more particularly to a detergent composition, a preparation method thereof, and a dissoluble detergent tablet.

BACKGROUND ART

Laundry detergent capsules and detergent tablets have gained significant market popularity due to properties of high concentration, precise detergent dosing, and green and environmental protection. The production of the laundry detergent capsules and detergent tablets relies heavily on film-forming agents. Given the essential role and high usage volume, there is a strong preference for biodegradable and environmentally friendly materials as film formers. Polyvinyl alcohol (PVA) is currently one of the preferred choices among film-forming raw materials.

PVA exhibits excellent water solubility, and as a film-forming agent, PVA enhances the stability of the laundry detergent capsules or detergent tablets while ensuring high-quality molding. As a result, many manufacturers primarily use PVA as the film-forming agent in the laundry detergent capsules or detergent tablets.

However, despite the advantages, such as good water solubility and biodegradability, degree of degradation of PVA is highly dependent on microbial factors, and the degradation process of PVA may leave behind pollutants such as microplastics and nanoplastics, posing potential ecological and environmental risks. Additionally, since PVA is a synthetic petroleum-based polymer, some regions are now considering banning the sale or distribution of the laundry detergent capsules or detergent tablets containing PVA, which could limit widespread application of the laundry detergent capsules or detergent tablets.

SUMMARY

In order to provide a detergent composition which is more environmentally friendly, the present application provides a detergent composition, a preparation method thereof and a dissoluble detergent tablet.

In a first aspect, the present application provides a detergent composition adopting the following technical solution:

A detergent composition, wherein a raw material for preparing the detergent composition includes the following components by mass percentages:

anionic surfactant: 11-45%; nonionic surfactant: 1-15%; plant polysaccharide: 5-30%; shape promoting agent: 3-18%; builder: 5-20%; enzymatic preparation: 0-5%; chelating agent: 0.5-5%; essence: 0-0.5%; and a balance of water;

a ratio of a total mass of the anionic surfactant and the nonionic surfactant to a mass of the plant polysaccharide is (1-7): 1; and a mass ratio of the plant polysaccharide to the shape promoting agent is (0.4-9): 1.

By using the above technical solution, the detergent composition is in the form of a slurry, and a solid detergent tablet can be obtained after drying; since the plant polysaccharide is dissoluble at room temperature or at a low temperature, the detergent tablet obtained is applicable to different water temperatures in various seasons; and the plant polysaccharide is bio-based, does not contain microplastics or nano-plastics after decomposition, and is more environmentally friendly than polyvinyl alcohol.

During the preparation process, the slurry must possess appropriate viscosity and dense foam. On one hand, as a thickening agent, the plant polysaccharide can significantly increase the viscosity of the solution. When the water content is low, the plant polysaccharide prolongs foam lifetime during the slurry preparation process, thereby stabilizing the foam and contributing to the stable formation of the detergent tablet after subsequent drying. On the other hand, during the washing process, after the detergent tablet obtained dissolves in a large volume of water, the plant polysaccharide promotes the earlier formation of micelles by surfactants within the solution rather than adsorbing on the interface, thereby reducing foaming capacity. Simultaneously, due to the strong hydrophilicity, the plant polysaccharide spontaneously surrounds water molecules upon dissolution and competitively adsorbs at the gas-liquid interface, hindering the tight arrangement of surfactants at the gas-liquid interface. Consequently, the plant polysaccharide decreases foam stability and exerts a defoaming effect. Finally, the plant polysaccharide can be used as a soft water agent in hard water, tap water and other environments to combine with $Ca^{2+}$, $Mg^{2+}$, improve the stain-removing performance and can form dissoluble molecules, extend the contact time of surfactant with carbon black and sebum stains, help surfactant more fully emulsify oil and enhance the stability of emulsifying system, through the formation of colloidal network, the emulsified oil and dirt can be suspended in the cleaning system, help disperse and wrap carbon black and sebum particles, prevent secondary deposition, significantly improve the stain-removing performance for carbon black and sebum.

In addition, when there is excessive surfactant, the thickening property of the plant polysaccharide disappears completely because the ion tolerance is not high, so that the optimum thickening effect of the plant polysaccharide can be exerted only at a certain ratio, thereby forming a stable detergent tablet.

Alternatively, the anionic surfactant includes one or more of $C_{12}$-$C_{18}$ fatty alcohol sulfate, $C_{12}$-$C_{14}$ alkyl ether sulfate, sodium $C_{14}$-$C_{16}$ α-olefin sulfonate, and $C_{12}$-$C_{18}$ fatty acid methyl ester sulfonate; and the nonionic surfactant includes one or more of fatty alcohol polyoxyethylene ether, fatty acid methyl ester ethoxylate, alkyl ethoxy polyglycosides, sophorolipid, rhamnolipid, sucrose fatty acid ester, and PEG-7 glyceryl cocoate.

By using the above technical solution, the surfactant cooperates with the plant polysaccharide, so that the slurry of the detergent composition maintains a certain viscosity and a dense foam, and in the washing process, the grease is sufficiently emulsified, and the dirt particles are dispersed and coated, so as to improve the stain-removing capability.

Alternatively, the plant polysaccharide includes one or more of alginate, hydroxypropyl methylcellulose, sodium carboxymethyl cellulose, pectin, inulin, carboxymethyl starch ether, hydroxypropyl starch ether, oxidized starch, and carrageenan.

By using the above technical solution, the plant polysaccharide has excellent water solubility and exhibits remarkable thickening effects during the preparation of the detergent composition, which effectively maintains the slurry in a state of dense foam while significantly enhancing the stability of the obtained solid detergent tablet.

Alternatively, the shape promoting agent is a $C_3$-$C_8$ polyol.

By using the above technical solution, during the preparation of the slurry, the $C_3$-$C_8$ polyol can prevent the plant polysaccharide from clumping when contacting with water, and improve the dispersion stability of the slurry; in addition, during the preparation of the detergent tablet, the $C_3$-$C_8$ polyol can combine with multiple reaction sites of the plant polysaccharide to form a three-dimensional network structure and increase the crosslinking density, thereby better shaping of the detergent tablet and improving the toughness of the detergent tablet.

Alternatively, the shape promoting agent includes one or more of glycerol, propylene glycol, butanediol, pentanediol, hexanediol, heptanediol, and octanediol.

Alternatively, the builder includes one or more of plant starch, kaolin, bentonite, and silicon dioxide.

By using the above technical solution, the builder has a toughening effect on the detergent tablet, reduces the brittleness of the detergent tablet, and improves the stain-removing capability of the detergent tablet.

Alternatively, the plant starch includes one or more of commercially available starches including soybean starch, cassava starch, corn starch, pea starch, and sweet potato starch.

Alternatively, the chelating agent includes one or more of citric acid and salts thereof, gluconic acid and salts thereof, tetrasodium glutamate diacetate, trisodium methylglycine diacetate, polyaspartic acid and salts thereof, and polyglutamic acid and salts thereof.

By using the above technical solution, the chelating agent can chelate metal ions in hard water or tap water, and form a synergistic and superior water softening effect with the plant polysaccharide, and the chelating agent can play the role of adjusting the value of pH of the slurry.

Alternatively, the enzymatic preparation includes one or more of proteases, cellulases, phosphodiesterases, amylases, pectinases, mannanases, and lipases.

Alternatively, the enzymatic preparation includes at least one of the enzyme preparation in liquid form and the enzyme preparation in solid form.

Alternatively, the raw material further includes plant extracts and/or dyes.

By using the above technical solution, the plant extracts may be added according to product requirements to provide antibacterial effects or natural fragrance retention, or the dyes may be added to make the detergent composition present a specific color.

In a second aspect, the present application provides a method for preparing a detergent composition adopting the following technical solution:

A method for preparing the detergent composition, including the following steps mixing the plant polysaccharide with the shape promoting agent under stirring to wet a solid powder of the plant polysaccharide with the shape promoting agent to obtain a premix;

mixing the anionic surfactant with a pre-heated water, and after standing until completely dissolved into a homogeneous phase, adding the premix in batches under stirring to obtain a mixture; and adding the builder to the mixture, stirring until uniform, then adding the nonionic surfactant, and adding the chelating agent to adjust a value of pH to 6-8, then adding the enzymatic preparation in liquid form and remaining components, and continuing stirring to obtain the detergent composition.

According to the above technical solution, since a large amount of plant polysaccharides are directly combined with water to form lumps, and after the plant polysaccharides outside the lumps absorb water and swell, the plant polysaccharides inside cannot be dissolved to formthe premix at first, and therefore the plant polysaccharides are firstly mixed with the shape promoting agent for wetting, so as to promote the subsequent dissolution of plant polysaccharides in the mixture.

The anionic surfactant is mixed with water and allowed to dissolve statically without stirring, thereby preventing foam formation prior to the addition of plant polysaccharides, which facilitates subsequent complete water absorption and swelling of the plant polysaccharides, providing the mixture with appropriate viscosity and maintaining dense foam.

Alternatively, the detergent composition may further include plant extracts and/or dyes.

Alternatively, the viscosity of the mixture is controlled in the range of 5000-20000 mpa·S.

In a third aspect, the present application provides a dissoluble detergent tablet, adopting the following technical solution:

A dissoluble detergent tablet, produced by drying and then slicing the detergent composition; wherein, if the enzymatic preparation in the detergent composition is in solid form, the enzymatic preparation is not added during preparation of the detergent composition, but is instead sprinkled onto sliced tablets.

By using the above technical solution, a solid detergent tablet is formed, the detergent tablet has good solubility, high stability, meets the environmental protection requirements of not containing petroleum-based materials, and has a strong stain-removing capability.

Alternatively, drying methods for the detergent composition include a casting method and a drum method.

The casting method: the detergent composition slurry is cast and then formed through air-blowing drying equipment.

The drum method: the detergent composition slurry is placed on a drum, where rolling spreads the slurry, and heating on the drum facilitates formation.

In summary, the present application has the following technical effects:

1. The detergent composition is in the form of a slurry, and a solid detergent tablet can be obtained after drying; since the plant polysaccharide is dissoluble at room temperature or at a low temperature, the detergent tablet obtained is applicable to different water temperatures in various seasons; and the plant polysaccharide is bio-based, does not contain micro-plastics or nano-plastics after decomposition, and is more environmentally friendly than polyvinyl alcohol.
2. During the preparation process, the slurry must possess appropriate viscosity and dense foam. On one hand, as a thickening agent, the plant polysaccharide can significantly increase the viscosity of the solution. When the water content is low, the plant polysaccharide prolongs foam lifetime during the slurry preparation process, thereby stabilizing the foam and contributing to the stable formation of the detergent tablet after subsequent drying. On the other hand, during the washing process, after the detergent tablet obtained dissolves in a large volume of water, the plant polysaccharide promotes the earlier formation of micelles by surfactants within the solution rather than adsorbing on the interface, thereby reducing foaming capacity. Simultaneously, due to the strong hydrophilicity, the plant polysaccharide spontaneously surrounds water molecules upon dissolution and competitively adsorbs at the gas-liquid interface, hindering the tight arrangement of surfactants at the gas-liquid interface. Consequently, the plant polysaccharide decreases foam stability and exerts a defoaming effect. Finally, the plant polysaccharide can be used as a soft water agent in hard water, tap water and other environments to combine with $Ca^{2+}$, $Mg^{2+}$, improve the stain-removing performance and can form dissoluble molecules, extend the contact time of surfactant with carbon black and sebum stains, help surfactant more fully emulsify oil and enhance the stability of emulsifying system, through the formation of colloidal network, the emulsified oil and dirt can be suspended in the cleaning system, help disperse and wrap carbon black and sebum particles, prevent secondary deposition, significantly improve the stain-removing performance for carbon black and sebum.

DETAILED DESCRIPTION

Figure 1:
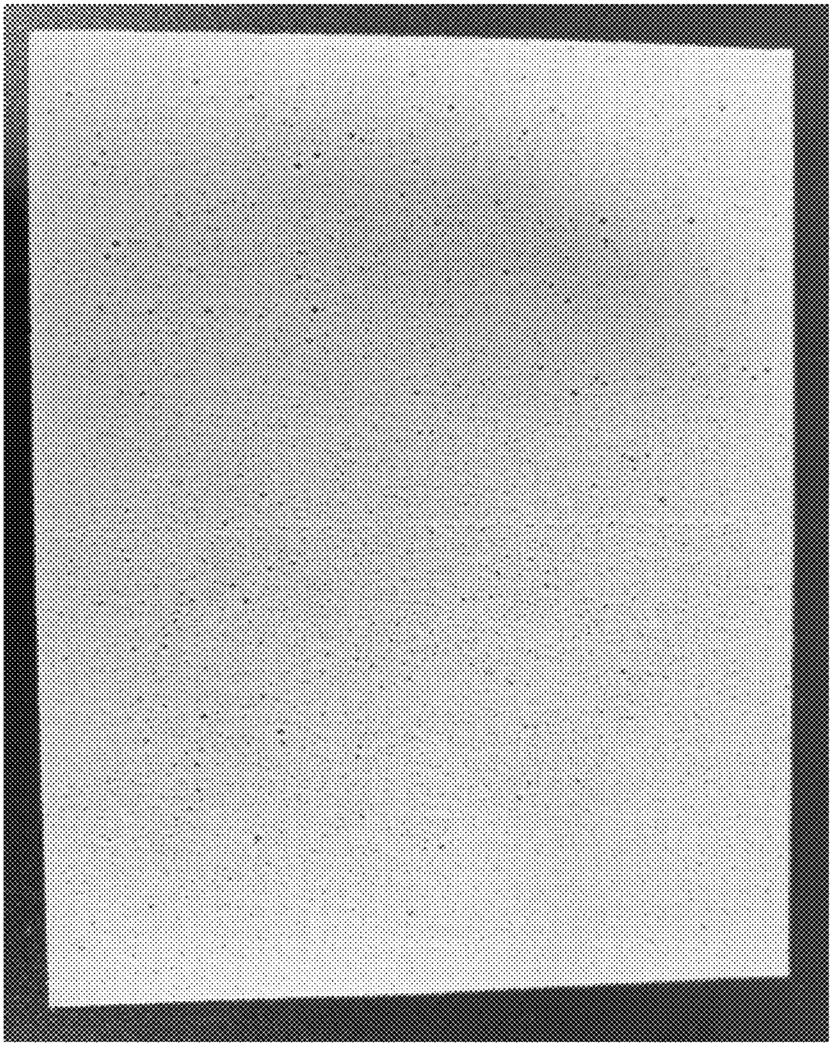
FIG. 1 is a photograph of a finished product of a dissoluble detergent tablet in Application Example 1 of the present application.

The present application is further described in detail below with reference to FIGS. 1-6.

Example 1

A detergent composition, wherein a raw material for preparing the detergent composition included the following components by mass percentages:

anionic surfactant: 40%; nonionic surfactant: 12%; plant polysaccharide: 10%; shape promoting agent: 4%; builder: 6%; enzymatic preparation: 3.5%; chelating agent: 1%; essence: 0.5%; and water: 23%.

Specifically, the anionic surfactant was $C_{12}$ fatty alcohol sulfate; the nonionic surfactant included 6% of sophorolipid, 4% of rhamnolipid, and 2% of sucrose fatty acid ester; the plant polysaccharide was alginate; the shape promoting agent was propylene glycol; the builder was kaolin; the enzymatic preparation was in liquid form and included 0.5% of protease, 0.5% of amylase, 0.5% of cellulase, 0.5% of pectinase, 0.5% of mannanase, 0.5% of lipase phospholipase, and 0.5% of phospholipase; and the chelating agent was sodium polyglutamate.

A method for preparing a detergent composition, which included the following steps:

the plant polysaccharide was mixed with the shape promoting agent under stirring to wet a solid powder of the plant polysaccharide with the shape promoting agent to obtain a premix;

the anionic surfactant was mixed with thr water at 50° C. (+5° C. constant temperature control), after standing until completely dissolved into a homogeneous phase, a resulting mixture was transferred to a blender, then the premix was added in batches and stirred at a rotating speed of 1050 r/min for 15 minutes, so that the plant polysaccharide absorbed water sufficiently and swelled to obtain a mixture, wherein the viscosity of the mixture was controlled to be 10000±5000 mpa·S; and the builder was added to the mixture and stirred until uniform; after the mixture turned from pale yellow to pure white, then the nonionic surfactant was added; the chelating agent was added to adjust a value of pH to 6-8; then the enzymatic preparation and the essence were added; and stirring was continued to obtain the detergent composition.

Examples 2 to 15

The difference between Examples 2 to 15 of the detergent compositions and Example 1 lies in that the raw materials for preparing the detergent compositions are different, and the specific raw materials are as shown in Tables 1 and 2.

TABLE 1

| Mass percentage/% | | Example 1 | Example 2 | Example 3 | Example 4 | Example 5 | Example 6 | Example 7 | Example 8 |
|---|---|---|---|---|---|---|---|---|---|
| Plant polysaccharide | Alginate | 10 | | | | 20 | | | |
| | Hydroxypropyl methylcellulose | | | | | | | | |
| | Sodium carboxymethylcellulose | | | 25 | | | | | |
| | Pectin | | | | 15 | | | | |
| | Inulin | | 6 | | | | | | |
| | Carboxymethyl starch ether | | | | | | 22 | | |
| | Oxidized starch | | | | | | | 25 | |

TABLE 1-continued

| Mass percentage/% | | Example 1 | Example 2 | Example 3 | Example 4 | Example 5 | Example 6 | Example 7 | Example 8 |
|---|---|---|---|---|---|---|---|---|---|
| | Carrageenan | | | | | | | | 18 |
| | Hydroxypropyl starch ether | | | | | | | | |
| Anionic surfacant | $C_{12}$—$C_{18}$ fatty alcohol sulfate | 40 | | 30 | | 13 | 20 | 7 | 32 |
| | $C_{12}$—$C_{14}$ alkyl ether sulfate | | | | 26 | | 13 | 6 | |
| | Sodium $C_{14}$—$C_{16}$ α-olefin sulfonate | | 34 | | | 12 | | 6 | |
| | $C_{12}$—$C_{18}$ fatty acid methyl ester sulfonate | | | | 6 | | | 5 | |
| Nonionic surfactant | Fatty alcohol polyoxyethylene ether | | | 4 | 3 | 2 | 5 | | |
| | Fatty acid methyl ester ethoxylate | | | | | | | | |
| | Alkyl ethoxy polyglycosides | | 6 | | 3 | | 4 | 1 | |
| | Sophorolipid | 6 | | | 4 | | | | |
| | Rhamnolipid | 4 | | | | 3 | | | |
| | Sucrose fatty acid ester | 2 | | | | | 2 | | |
| | PEG-7 glyceryl cocoate | | | | 3 | | | | 4 |
| Builder | Plant starch | | 10 | | | 3 | 5 | | 11 |
| | Kaolin | 6 | | | | 3 | 7 | | 2 |
| | Silica | | | 18 | | 2 | | 8 | |
| | Bentonite | | | | 15 | 2 | | 8 | 5 |
| Shape promoting agent | Propylene glycol | 4 | 5 | | | | | | |
| | Glycerol | | 5 | | | 7 | | | |
| | Butandiol | | 5 | | 6 | | | | |
| | Hexanediol | | | | | | | | 6 |
| | Pentanediol | | | 4 | | | | | |
| | Heptanediol | | | | | | 10 | | |
| | Octanediol | | | | | | | 11 | |
| Enzymatic preparation | Protease | 0.5 | 0.50 | 0.5 | | 0.5 | | 0.5 | |
| | Amylase | 0.5 | | 0.5 | | | | | |
| | Cellulase | 0.5 | | | | | | | |
| | Pectinase | 0.5 | | | 0.5 | | 0.5 | | |
| | Mannanase | 0.5 | | | | | | | |
| | Lipase | 0.5 | 0.5 | 0.5 | | 0.5 | | | 0.5 |
| | Phosphodiesterase | 0.5 | 0.5 | | 0.5 | 0.5 | | 0.5 | |
| Chelating agent | Sodium citrate | | | | | 1 | 0.5 | | |
| | Sodium gluconate | | 1 | | | | | 0.5 | |
| | Tetrasodium glutamate diacetate | | | 0.5 | | | | 0.5 | |
| | Polyaspartic acid and salts thereof | | 2 | | 0.5 | | | | 1 |
| | Sodium polyglutamate | 1 | | | | | | | |
| Essence | | 0.5 | 0.5 | 0.5 | 0.5 | 0.5 | | 0.5 | 0.5 |
| *Sapindus mukorossi* extract | | | | | | | | | |
| Water | | 23 | 24 | 16.5 | 17 | 30 | 11 | 20.5 | 20 |
| Total | | 100 | 100 | 100 | 100 | 100 | 100 | 100 | 100 |
| Total surfactant: plant polysaccharide | | 5.2 | 6.67 | 1.36 | 3 | 1.5 | 2 | 1 | 2 |
| Plant polysaccharide: shape promoting agent | | 2.50 | 0.40 | 6.25 | 2.50 | 2.86 | 2.20 | 2.27 | 3 |

TABLE 2

| Mass percentage/% | | Example 9 | Example 10 | Example 11 | Example 12 | Example 13 | Example 14 | Example 15 |
|---|---|---|---|---|---|---|---|---|
| Plant polysaccharide | Alginate | 5 | 10 | | 3 | 10 | | |
| | Hydroxypropyl methylcellulose | | | 11 | 2 | | | |
| | Sodium carboxymethyl-cellulose | | 5 | | 3 | | 5 | 30 |
| | Pectin | | | | 1 | | | |
| | Inulin | | | | 1 | | | |

TABLE 2-continued

| Mass percentage/% | | Example 9 | Example 10 | Example 11 | Example 12 | Example 13 | Example 14 | Example 15 |
|---|---|---|---|---|---|---|---|---|
| | Carboxymethyl starch ether | 2 | | 3 | 3 | | | |
| | Oxidized starch | | | | 2 | | | |
| | Carrageenan | | | 2 | | | | |
| | Hydroxypropyl starch ether | 7 | | | 1 | | | |
| Anionic surfacant | $C_{12}$—$C_{18}$ fatty alcohol sulfate | 15 | | | 9 | 30 | 3 | 45 |
| | $C_{12}$—$C_{14}$ alkyl ether sulfate | | 14 | 35 | 10 | | 3 | |
| | Sodium $C_{14}$—$C_{16}$ α-olefin sulfonate | 18 | | | 11 | | 5 | |
| | $C_{12}$—$C_{18}$ fatty acid methyl ester sulfonate | | 16 | | | | | |
| Nonionic surfactant | Fatty alcohol polyoxyethylene ether | | | | | | | 4 |
| | Fatty acid methyl ester ethoxylate | | | 3 | | | | |
| | alkyl ethoxy polyglycosides | | | 7 | | | 15 | |
| | Sophorolipid | | 7.5 | | | 6 | | |
| | Rhamnolipid | 5 | | | | 4 | | |
| | Sucrose fatty acid ester | | | | 3.6 | | | |
| | PEG-7 glyceryl cocoate | | | | | | | |
| Builder | Plant starch | 5 | | | 15 | | 20 | |
| | Kaolin | 1 | 5 | | | 6 | | |
| | Silica | 1 | 2 | 3 | | | | 5 |
| | Bentonite | | 4 | 7 | | | | |
| Shape promoting agent | Propylene glycol | | | | | | | |
| | Glycerol | 8 | 2 | 5 | 2 | 6 | 6 | 3.5 |
| | Butandiol | | | | 4 | 6 | | |
| | Hexanediol | | 1 | | | 6 | | |
| | Pentanediol | | | 1 | | | 4 | |
| | Heptanediol | | 3 | | | | | |
| | Octanediol | | | | 1 | | | |
| Enzymatic preparation | Protease | 0.5 | 0.5 | 0.5 | | 1 | 0.5 | |
| | Amylase | | | | | 1 | | |
| | Cellulase | | | | | 0.5 | | |
| | Pectinase | | | | | 1 | | |
| | Mannanase | | | | | 0.5 | | |
| | Lipase | | | | | 0.5 | 0.5 | 1 |
| | Phosphodiesterase | | | | 0.5 | 0.5 | 0.5 | |
| Chelating agent | Sodium citrate | 1.5 | 0.5 | | | | 1 | |
| | Sodium gluconate | | | | | | | |
| | Tetrasodium glutamate diacetate | | 1 | | 0.50 | | 2 | 0.5 |
| | Polyaspartic acid and salts thereof | | | 0.5 | | | 2 | |
| | Sodium polyglutamate | | 1 | | | 1 | | |
| Essence | | 0.5 | 0.5 | 0.5 | 0.5 | 0.5 | 0.5 | 0.5 |
| *Sapindus mukorossi* extract | | 0.5 | | | | | | |
| Water | | 30 | 27 | 21.5 | 26.9 | 19.5 | 32 | 10.5 |
| Total | | 100 | 100 | 100 | 100 | 100 | 100 | 100 |
| Total surfactant: plant polysaccharide | | 2.71 | 2.5 | 2.81 | 2.1 | 4 | 5.2 | 1.63 |
| Plant polysaccharide: shape promoting agent | | 1.75 | 2.50 | 2.67 | 2.29 | 0.55 | 0.5 | 8.57 |

The sodium $C_{12}$-$C_{14}$ α-olefin sulfonate in Example 2, Example 5, and Example 7 was specifically sodium $C_{12}$ α-olefin sulfonate; the sodium $C_{12}$-$C_{14}$ α-olefin sulfonate in Example 9, Example 12, and Example 14 was specifically sodium $C_{14}$ alpha-olefin sulfonate; the $C_{12}$-$C_{18}$ fatty 5 alcohol sulfate in Example 3, Example 5, Example 9, and Examples 12-15 was specifically sodium $C_{12}$ fatty alcohol sulfate; the $C_{12}$-$C_{18}$ fatty alcohol sulfate in Examples 6 to 8 was specifically sodium $C_{18}$ fatty alcohol sulfate; the $C_{12}$-$C_{14}$ alkyl ether sulfate in Example 4, Examples 10 to 12 was specifically sodium $C_{12}$ alkyl ether sulfate; the $C_{12}$-$C_{14}$ alkyl ether sulfate in Examples 6 and 7 and Example 14 was specifically sodium $C_{14}$ alkyl ether sulfate; the $C_{12}$-$C_{18}$ fatty acid methyl ester sulfonate in Example 4 and Example 7 was specifically sodium $C_{12}$ fatty alcohol sulfate; the $C_{12}$-$C_{18}$ fatty acid methyl ester sulfonate in Example 10 was specifically sodium $C_{12}$ fatty alcohol sulfate.

Comparative Example 1

The difference between this comparative example and Example 1 lies in that the raw material for preparing the detergent composition is different, and the details are as follows:

the mass percentage of the kaolin was 16%, and the addition amount of the plant polysaccharide was 0.

Comparative Example 2

The difference between this comparative example and Example 1 lies in that the raw material for preparing the detergent composition is different, and the details are as follows: the addition amount of kaolin was 0, and the mass percentage of the plant polysaccharide was 16%.

Comparative Example 3

The difference between this comparative example and Example 2 lies in that the raw material for preparing the detergent composition is different, and the details are as follows: the sodium $C_{14}$ α-olefin sulfonate accounted for 42% and the water accounted for 16%, so that the ratio of the total mass of the anionic surfactant and the nonionic surfactant to the mass of the plant polysaccharide was 8:1.

Comparative Example 4

The difference between this comparative example and Example 1 lies in that the raw material for preparing the detergent composition is different, and the details are as follows: the addition amount of the propylene glycol was 1%, the addition amount of the water was 26%, and the mass ratio of the plant polysaccharide to the shape promoting agent was 10:1.

Comparative Example 5

The difference between this comparative example and Example 2 lies in that the raw material for preparing the detergent composition is different, and the details are as follows:

Hexanediol was further added in an amount of 1%, the water was added in an amount of 23%, and the mass ratio of the plant polysaccharide to the shape promoting agent was 0.375:1.

Comparative Example 6

The difference between this Comparative Example and Example 5 lies in that the raw material and method for preparing the detergent composition are different, and the details are as follows:

Raw material: the addition amount of plant polysaccharide was 0, and polyvinyl alcohol was newly added, and the mass percentage of polyvinyl alcohol was 20%.

Preparation method: the polyvinyl alcohol was mixed with the water at 90° C. until the polyvinyl alcohol swelled and fully dissolved; the chelating agent, the anionic surfactant, and the nonionic surfactant were added and dissolved for 60 min; and the shape promoting agent, the builder, the enzymatic preparation and the essence were added to obtain a slurry, thus preparing the detergent composition.

Application Example 1

A dissoluble detergent tablet produced by drying and then slicing the detergent composition prepared in Example 1.

The drying methods include a casting method and a drum method.

The casting method: the slurry is cast and then formed through air-blowing drying equipment.

The drum method: the slurry is placed on a drum, where rolling spreads the slurry, and heating on the drum facilitates formation.

The preparation of the detergent tablet was carried out in particular by the casting method in this application example.

Application Examples 2 to 15

The difference between Application Examples 2 to 15 of the dissoluble detergent tablets and Application Example 1 lies in that the dissoluble detergent tablets of Application Examples 2 to 15 were respectively produced by drying and then slicing the detergent compositions prepared in Examples 2 to 15.

The dissoluble detergent tablets prepared in Application Examples 1-15 exhibited complete formation without powder shedding or fragility. Taking the dissoluble detergent tablet of Application Example 1 as an example (as shown in FIG. 1), the dissoluble detergent tablet presented macroscopically visible foam cells that facilitated dissolution. In alternative embodiments, Application Examples 1-15 used the drum method to prepare the dissoluble detergent tablets, which similarly obtained fully-formed tablets without powder shedding or fragility.

Comparative Application Example 1-Comparative Application Example 6

The difference between Comparative Application Examples 1 to 6 of the dissoluble detergent tablets and Application Example 1 lies in that the dissoluble detergent tablets of Comparative Application Examples 1 to 6 were respectively produced by drying and then slicing the detergent compositions prepared in Comparative Examples 1 to 6.

Figure 2:
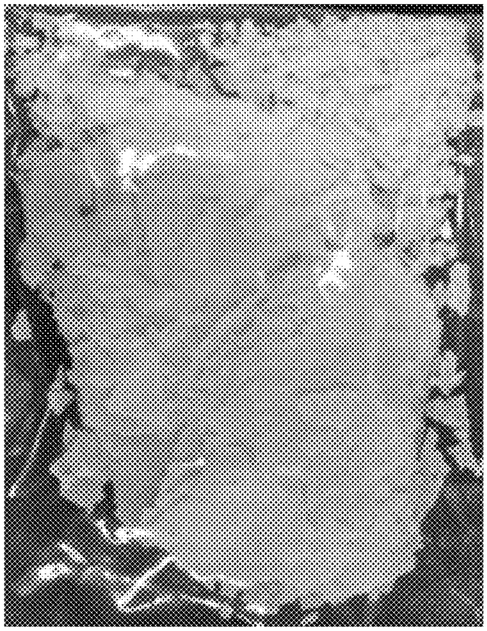
FIG. 2 is a photograph of a finished product of a dissoluble detergent tablet in Comparative Application Example 2 of the present application.
Figure 3:
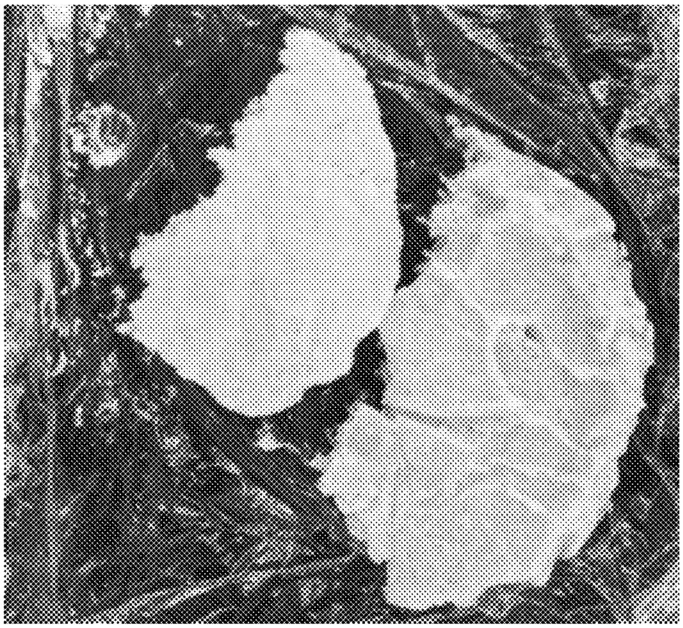
FIG. 3 is a photograph of a finished product of a dissoluble detergent tablet in Comparative Application Example 3 of the present application.

The dissoluble detergent tablet prepared in Comparative Application Example 1 failed to form a tablet; the dissoluble detergent tablet prepared in Comparative Application Example 2 was dry and brittle, as shown in FIG. 2. The dissoluble detergent tablet prepared in Comparative Application Example 3 was not formed, and the plant polysaccharide was delaminated with other substances, as shown in FIG. 3. The test for Comparative Application Example 3 below was conducted by taking the chips with better quality. The dissoluble detergent tablet prepared in Comparative Application Example 4 was de-pulverized. The dissoluble detergent tablet prepared in Comparative Application Example 5 was brittle and de-pulverized.

The dissoluble detergent tablet prepared in Comparative Application Example 6 can be normally formed, but the addition of polyvinyl alcohol may bring about ecological risks such as microplastics, etc. Moreover, the polyvinyl alcohol needs to be dissolved at a high temperature of 85° C. or higher during the preparation process, which consumes a large amount of energy.

Performance Test

The dissoluble detergent tablets prepared in the Application Examples and Comparative Application Examples were subjected to the following tests.

1. Stain-Removing Test

① Fabric stain-removing test: The detergency is determined according to GB/T 13174-2021 "Determination of detergency and cycle of washing property for laundry detergents", the washing water is 250 mg/kg $CaCl_2$) hard water, the test cloth is national standard carbon black JB-01 dirty cloth, national standard protein JB-02 dirty cloth and national standard sebum JB-03 dirty cloth. The stain-removing ratio (Pi) was determined at a sample concentration of 0.05%, with a 0.2% standard liquid detergent as a control, wherein when Pi≥1.0 was qualified, Pi<1.0 was unqualified.

② Kitchen grease removal test: The test was conducted according to GB/T 35833-2018 "Cleaner for kitchen stains and grease", a 3% sample solution was prepared.

③ Hard floor stain-removing test: The test was conducted according to QB/T4532-2013 "Hard Floor Cleaner", a 0.5% sample solution was prepared.

④ Household dishwasher cleaning test: 22 pieces of tableware (including porcelain bowls/plates, plastic bowls, stainless steel bowls/plates/cups/chopsticks/spoons, etc.) were prepared in advance, approximately 20 g of mixed grease stains was weighed, the grease stains was evenly applied to the test tableware and then washed; preparation of mixed grease stains: the red wine, cooking oil, chili sauce, tomato sauce, peanut butter, fruit jam, salad dressing, butter, light cream, barbecue sauce, condensed milk, cheese, chocolate, chili oil, soy sauce, wasabi, and sesame oil were thoroughly mixed and set aside; preparation of coffee stains/red wine stains/fruit juice stains/tea stains: the staining solution was poured into ceramic/glass cups (until completely filled), placed in an 80° C. oven, 10 mL of the staining solution was extracted every 10 minutes, the operation was repeated until 5 dried stain marks were formed, then the ceramic/glass cups were removed and cooled to room temperature for 3 days of aging.

One 4 g detergent tablet sample was placed in the designated dispenser compartment of the dishwasher and the washing cycle was conducted using the normal mode (59 minutes), then the post-wash cleanliness was observed.

The fabric stain-removing test results are as shown in Table 3; the kitchen grease removal, hard floor stain-removing, and dishwasher stain-removing test results are as shown in Table 4.

TABLE 3

| Stain-removing ratio (Comparison with standard solution) | National standard carbon black soiled fabric | National standard protein soiled fabric | National standard sebum soiled fabric | General stain-removing |
|---|---|---|---|---|
| Application Example 1 | 1.34 | 1.68 | 1.66 | 4.68 |
| Application Example 2 | 1.03 | 1.60 | 1.68 | 4.11 |
| Application Example 5 | 1.56 | 1.55 | 1.71 | 4.82 |
| Comparative Application Example 2 | 0.78 | 1.38 | 1.48 | 3.64 |
| Comparative Application Example 3 | 0.86 | 1.37 | 1.46 | 3.69 |
| Comparative Application Example 4 | 0.89 | 1.35 | 1.46 | 3.70 |
| Comparative Application Example 5 | 0.74 | 1.35 | 1.04 | 3.13 |
| Comparative Application Example 6 | 1.13 | 1.52 | 1.18 | 3.83 |

TABLE 4

| | Kitchen grease removal rate (%) | Hard floor stain-removing rate (%) | Dishwasher stain-removing efficiency (%) |
|---|---|---|---|
| Application Example 1 | 92.2 | 96.7 | 92 |
| Application Example 2 | 97.4 | 96.6 | 95 |
| Application Example 3 | 97.1 | 96.7 | 96 |
| Application Example 4 | 97.9 | 96.8 | 96 |
| Application Example 5 | 98.3 | 98.6 | 95 |
| Application Example 6 | 92.8 | 98.4 | 94 |
| Application Example 7 | 96.9 | 97.6 | 93 |
| Application Example 8 | 97.0 | 98.5 | 92 |
| Application Example 9 | 97.3 | 98.5 | 93 |
| Application Example 10 | 98.6 | 98.6 | 94 |
| Application Example 11 | 98.5 | 97.8 | 93 |
| Application Example 12 | 98.7 | 98.2 | 92 |
| Application Example 13 | 98.3 | 98.5 | 94 |
| Application Example 14 | 92.7 | 97.6 | 94 |
| Application Example 15 | 95.8 | 97.9 | 92 |
| Comparative Application Example 1 | Failing to form an intact tablet | | |
| Comparative Application Example 2 | 76.1 | 83.5 | 84 |
| Comparative Application Example 3 | 75.4 | 88.9 | 88 |
| Comparative Application Example 4 | 77.9 | 87.2 | 86 |
| Comparative Application Example 5 | 70.8 | 79.8 | 82 |

It can be seen that in the present application, using the plant polysaccharide as a film-forming agent instead of polyvinyl alcohol, and combining the surfactant in a suitable proportion can ensure that the detergent tablet is environmentally friendly and formed completely, and also has a good stain-removing capability, and can deal with stains in various scenes.

2. High-Temperature High-Humidity Test

The test was conducted according to QB/T5779-2023 "Laundry Tablets", samples of better quality were selected and packed in paper boxes (with detergent tablets stacked vertically inside and a white cardboard placed at the bottom), then placed under three test conditions: room temperature, 45±2° C., and 40±2° C. with relative humidity of 70±5% RH, four replicate groups were prepared for each condition, after 48 hours of testing, one group was taken out from each condition and the two detergent tablets were separated to observe whether there is any adhesion between tablets or oil seepage phenomenon, and the test results are as shown in Table 5.

Figure 4:
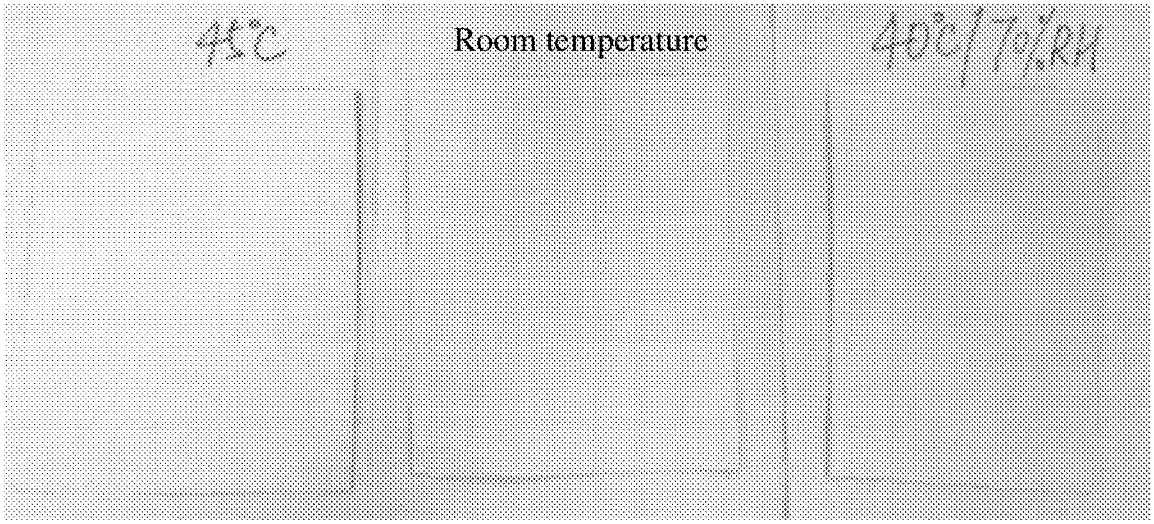
FIG. 4 is a photograph of oil leakage of the dissoluble detergent tablet in Application Example 1 of the present application.
Figure 5:
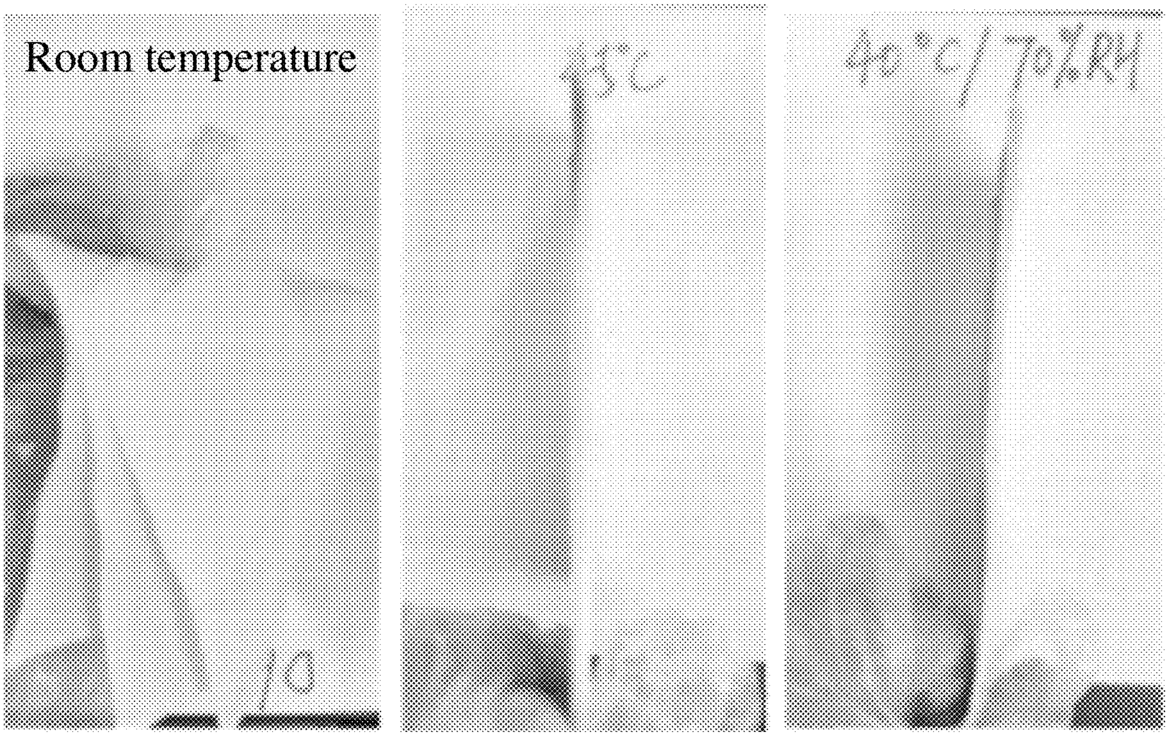
FIG. 5 is a photograph of adhesion of a dissoluble detergent tablet in Comparative Application Example 4 of the present application.
Figure 6:
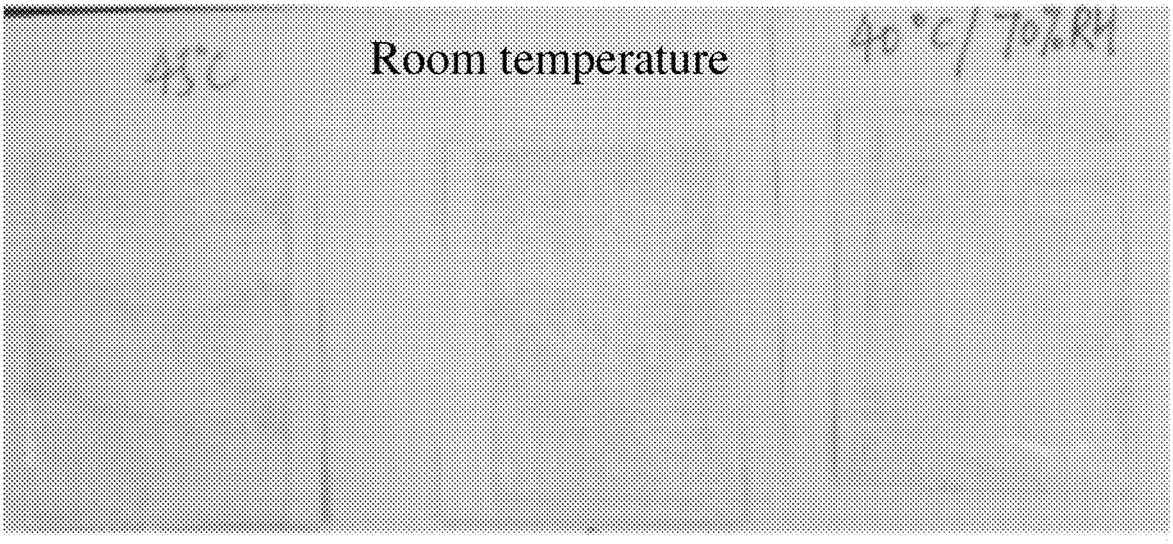
FIG. 6 is a photograph of oil leakage of the dissoluble detergent tablet in Comparative Application Example 4 of the present application.

The oil seepage of Application Example 1 is as shown in FIG. 4, the adhesion of Comparative Application Example 4 is as shown in FIG. 5 and the oil seepage of Comparative Application Example 4 is as shown in FIG. 6.

TABLE 5

| | Results |
|---|---|
| Application Example 1 | All three test conditions showed no adhesion and no oil seepage |
| Application Example 2 | All three test conditions showed no adhesion and no oil seepage |
| Application Example 5 | All three test conditions showed no adhesion and no oil seepage |
| Comparative Application Example 2 | Room temperature: no oil seepage; 45° C.: oil seepage and adhesion; 40° C./70% RH: severe oil seepage, tablets adhered to cardboard and could not be separated |

TABLE 5-continued

| | Results |
|---|---|
| Comparative Application Example 4 | Room temperature: oil seepage; 45° C. and 40° C./70% RH: severe adhesion |
| Comparative Application Example 5 | Room temperature: oil seepage; 45° C. and 40° C./70% RH: severe adhesion |
| Comparative Application Example 6 | Room temperature: no oil seepage; 45° C.: oil seepage and no adhesion; 40° C./70% RH: tablets adhered to cardboard |

3. Water Solubility Test

A 1 L beaker filled with 700 mL hard water (250 mg/kg calcium chloride) was placed in a 15±2° C. water bath, magnetic stirring speed was adjusted, and samples were cut into 3 cm×3 cm squares, vertically dropped from 10 cm above the water surface parallel to the water. Timing began upon water contact of the samples and ceased upon complete dispersion, recording dissolution time. Tests were repeated 3 times in parallel. The results are recorded in the table. In addition, a 250 ml beaker containing 200 mL of hard water (calcium chloride) was placed in a 25±2° C. water bath, the samples were cut into 3 cm×3 cm squares, vertically dropped from 10 cm above the water surface parallel to the water. The dissolution process of the samples was observed statically without stirring.

Foam test: 2 kg of garments was prepared and placed in a drum washing machine together with one 4 g detergent tablet sample, the washing machine was set to a 39-minute cycle with water temperature maintained at 25±2° C., the foam conditions were observed and recorded 5 minutes after the washing cycle begins.

In the foam test, the detergent tablets from Application Example 5 and Comparative Example 6 were used for comparison. The washing results indicate that Application Example 5 produced less foam, while Comparative Example 6 showed significantly more foam.

4. Washing Residue Test for Washing Machine

Five garments of different materials were prepared, one 4 g detergent tablet sample was placed in each garment or hem and secured with rubber bands, then the garments were wrapped in white fabric (three garments per fabric), and washed in a 39-minute machine cycle, then inspected for residues.

The results of the water dissolution test and the washing residue test for the washing machine are as shown in Table 6.

TABLE 6

| | Washing residue condition for washing machine | Dissolution time |
|---|---|---|
| Application Example 1 | None | 84.81 seconds |
| Application Example 2 | None | 76.22 seconds |
| Application Example 3 | None | 87.60 seconds |
| Application Example 4 | None | 78.11 seconds |
| Application Example 5 | None | 82.22 seconds |
| Application Example 6 | None | 77.60 seconds |
| Application Example 7 | None | 90.92 seconds |
| Application Example 8 | None | 88.95 seconds |
| Application Example 9 | None | 86.17 seconds |
| Application Example 10 | None | 70.84 seconds |
| Application Example 11 | None | 71.87 seconds |
| Application Example 12 | None | 83.02 seconds |

TABLE 6-continued

| | Washing residue condition for washing machine | Dissolution time |
|---|---|---|
| Application Example 13 | None | 83.20 seconds |
| Application Example 14 | None | 85.48 seconds |
| Application Example 15 | None | 79.34 seconds |
| Comparative Application Example 1 | Failing to form an intact tablet | |
| Comparative Application Example 2 | Present | >3 minutes |
| Comparative Application Example 3 | Present | 15 minutes undissolved |
| Comparative Application Example 4 | Present | 2 minutes and 9.59 seconds |
| Comparative Application Example 5 | Present | 15 minutes undissolved |

It can be seen that the detergent tablet obtained in the present application has good water solubility, has an obvious defoaming effect during use, and has a small washing residue.

5. Biodegradation Test

The test was conducted according to the method in Appendix A of "Test Method for Biodegradability of Surfactants" (GB/T 15818-2018).

6. Biobased Content Test

Test requirements: The test conducted in compliance with ISO/IEC 17025:2017 testing and certification standards (PJLA #59423).

Test results for the biodegradation and bio-based content are shown in Table 7.

TABLE 7

| | 7-day biodegradation rate (%) | Biobased content/% |
|---|---|---|
| Application Example 5 | 99 | 70.07 |
| Comparative Application Example 6 | 90 | 34.77 |

Based on the above test results, it can be seen that the detergent compositions prepared in the examples have good detergent tablet forming effect, strong stain-removing capability, adaptability to various stains and environment, rapid dissolution and no residue, and there is a significant improvement in biodegradability and environmental protection by using bio-based plant polysaccharides instead of petroleum-based polyvinyl alcohol.

This specific embodiment is provided solely for explaining the present application and shall not be construed as limiting the present application. Any person skilled in the art may, after reading this specification, make modifications to this specific embodiment as needed without creative contribution, provided that such modifications fall within the scope of the claims of the present application and shall be protected under patent law.

What is claimed is:

1. A detergent composition, wherein a raw material for preparing the detergent composition comprises the following components by mass percentages:

A) from 24-45% anionic surfactant;

B) from 1-15% nonionic surfactant;

C) from 10-30% of a plant polysaccharide selected from the group consisting of alginate, hydroxypropyl methylcellulose, sodium carboxymethyl cellulose, pectin, inulin, carboxymethyl starch ether, hydroxypropyl starch ether, oxidized starch, carrageenan, or mixtures thereof;

D) from 3-18% of a $C_3$-$C_8$ polyol as a shape promoting agent;

E) from 5-20% builder;

F) from 0-5% enzymatic preparation;

G) from 0.5-5% chelating agent;

H) from 0-0.5% essence; and

I) from 10.5-30% water, wherein a ratio of a total mass of the anionic surfactant and the nonionic surfactant to a mass of the plant polysaccharide is (1-7):1; and a mass ratio of the plant polysaccharide to the shape promoting agent is (0.4-9):1.

2. The detergent composition according to claim 1, wherein the anionic surfactant comprises one or more of $C_{12}$-$C_{18}$ fatty alcohol sulfate, $C_{12}$-$C_{14}$ alkyl ether sulfate, sodium $C_{14}$-$C_{16}$ $\alpha$-olefin sulfonate, or $C_{12}$-$C_{18}$ fatty acid methyl ester sulfonate; and the nonionic surfactant comprises one or more of fatty alcohol polyoxyethylene ether, fatty acid methyl ester ethoxylate, alkyl ethoxy polyglycosides, sophorolipid, rhamnolipid, sucrose fatty acid ester, or polyethylene glycol 7 (PEG-7) glyceryl cocoate.

3. The detergent composition according to claim 1, wherein the builder comprises one or more of plant starch, kaolin, bentonite, or silicon dioxide.

4. The detergent composition according to claim 1, wherein the chelating agent comprises one or more of citric acid and salts thereof, gluconic acid and salts thereof, tetrasodium glutamate diacetate, trisodium methylglycine diacetate, polyaspartic acid and salts thereof, or polyglutamic acid and salts thereof.

5. The detergent composition according to claim 1, wherein the raw material further comprises at least one of plant extracts or dyes.

6. A method for preparing the detergent composition according to claim 1, comprising the following steps:

mixing the plant polysaccharide with the shape promoting agent under stirring to wet a solid powder of the plant polysaccharide with the shape promoting agent to obtain a premix;

mixing the anionic surfactant with a pre-heated water, and after standing until completely dissolved into a homogeneous phase, adding the premix in batches under stirring to obtain a mixture; and adding the builder to the mixture, stirring until uniform, then adding the nonionic surfactant, and adding the chelating agent to adjust a value of pH to 6-8, then adding the enzymatic preparation in liquid form and remaining components, and continuing stirring to obtain the detergent composition.

7. A dissoluble detergent tablet, wherein the dissoluble detergent tablet is produced by drying and then slicing the detergent composition according to claim 1; wherein, when the enzymatic preparation in the detergent composition is in solid form, the enzymatic preparation is not added during preparation of the detergent composition, but is instead sprinkled onto sliced tablets.

* * * * *